United States Patent
Fargo

(10) Patent No.: US 8,669,016 B2
(45) Date of Patent: Mar. 11, 2014

(54) SWIRL CHAMBER FOR A FUEL CELL COOLING MANIFOLD

(75) Inventor: Richard N. Fargo, Plainville, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1195 days.

(21) Appl. No.: 12/572,504

(22) Filed: Oct. 2, 2009

(65) Prior Publication Data

US 2011/0081589 A1   Apr. 7, 2011

(51) Int. Cl.
*H01M 8/04* (2006.01)

(52) U.S. Cl.
USPC ........... 429/437; 429/433; 429/434; 429/436; 429/442

(58) Field of Classification Search
USPC ............................ 429/433, 434, 436, 437, 442
See application file for complete search history.

(56) References Cited

U.S. PATENT DOCUMENTS

| | | | |
|---|---|---|---|
| 1,381,095 A | 6/1921 | Starr | |
| 2,893,432 A | 7/1959 | Gibson | |
| 3,083,917 A | 4/1963 | Abplanalp et al. | |
| 3,198,214 A | 8/1965 | Lorenz | |
| 4,112,977 A | 9/1978 | Syred et al. | |
| 5,700,595 A * | 12/1997 | Reiser | 429/437 |
| 5,858,567 A | 1/1999 | Spear, Jr. et al. | |
| 6,106,963 A * | 8/2000 | Nitta et al. | 429/513 |
| 6,303,245 B1 | 10/2001 | Nelson | |
| 6,649,299 B2 | 11/2003 | Appleby et al. | |
| 6,794,077 B2 | 9/2004 | Yi et al. | |
| 7,118,819 B2 * | 10/2006 | Grasso | 429/437 |
| 7,435,502 B2 | 10/2008 | Breault et al. | |

* cited by examiner

*Primary Examiner* — Patrick Ryan
*Assistant Examiner* — Julian Anthony
(74) *Attorney, Agent, or Firm* — Carlson, Gaskey & Olds

(57) ABSTRACT

A fuel cell manifold holding pressurized cooling fluid is attached to a plurality of cells. A swirl chamber communicating cooling fluid from the manifold to the cells slows the speed of the cooling fluid and lowers its pressure as it enters a fuel cell cooling path.

18 Claims, 1 Drawing Sheet

SWIRL CHAMBER FOR A FUEL CELL COOLING MANIFOLD

BACKGROUND

A fuel cell is a device that converts chemical energy of a fuel into electrical energy, typically by oxidizing the fuel. In general, a fuel cell includes an anode and a cathode fluid flow plate separated by an electrolyte. When fuel is supplied to the anode and oxidant is supplied to the cathode, the electrolyte electrochemically generates a useable electric current that is passed through an external load. The fuel typically supplied is hydrogen and the oxidant typically supplied is oxygen. In such cells, the electrolyte combines the oxygen and hydrogen to form water and to release electrons.

The anode and cathode fluid flow plates are made of an electrically conductive material, typically metal or compressed carbon, in various sizes and shapes. Fluid flow plates act as current collectors, provide paths for access of the fuels and oxidants to the cell, and provide a path for removal of waste products formed during operation of the cell. Additionally, the fluid flow plates include a fluid flow field of channels for directing fluids within the cell.

Fuel cells are classified into several types according to the electrolyte used to accommodate ion transfer during operation. Examples of electrolytes include aqueous potassium hydroxide, phosphoric acid, fused alkali carbonate, stabilized zirconium oxide, and solid polymers, e.g., a solid polymer ion exchange membrane.

Fuel cells usually are arranged as a multi-cell assembly or "stack." In a multi-cell stack, multiple cells are connected together in series. The number and arrangement of single cells within a multi-cell assembly are adjusted to increase the overall power output of the fuel cell. Typically, the cells are connected in series with one side of a fluid flow plate acting as the anode for one cell and the other side of the fluid flow plate acting as the cathode for an adjacent cell.

Fluid flow plates also have holes therethrough for alignment and for formation of fluid manifolds some of which distribute fuel and oxidant to, and remove unused fuel and oxidant as well as product water from, the fluid flow fields of the plates. Other fluid manifolds circulate cooling fluid. Cooling mechanisms, such as cooling plates, may be installed within the stack between adjacent single cells to allow circulated cooling fluid to remove heat generated during fuel cell operation. Each layer in the stack is cooled to prevent overheating and to provide an optimum environment in which ions cross the electrolytes in each cell.

Pressurized cooling fluid, such as water, may be provided through a manifold to ensure that water reaches each cell in the stack and to provide proper cooling within that cell. However, the pressure in the manifold may be greater than necessary to cool each cell. Openings from the manifold to a water path within each cell are then desired to be smaller to ensure a proper pressure drop into each cell and therefore, a proper flow rate through each cell. However, smaller openings may be prone to blockage and such blockage may cause overheating that can damage a cell and a stack.

The conflicting requirements of small openings from the manifold to each cell and minimized blockages are typically satisfied by using long coils of tubing and flow splitters for each pair of cooling elements. This solution however, is costly in terms of both materials and labor.

SUMMARY

According to a non-limiting embodiment to be shown and described herein, a cooling system for a fuel cell stack includes a manifold for delivering cooling fluid under pressure to the fuel cell stack, and a chamber communicating the cooling fluid from the manifold to the fuel cell stack for lowering the pressure of the cooling fluid before entering the fuel cell stack.

According to a further embodiment, a cooling system for a fuel cell stack includes a cell having a cooling fluid path opening therein, a manifold for delivering cooling fluid under pressure, a chamber communicating the cooling fluid from the manifold to the cell for lowering the pressure of the cooling fluid before entering the cell.

According to a further embodiment, a method of lowering pressure of a cooling fluid entering a fuel cell stack includes communicating the cooling fluid from a manifold holding the cooling fluid, creating a vortex within the cooling fluid to lower the pressure of the cooling fluid, and communicating the cooling fluid to the fuel cell stack.

These and other objects have an advantage of the embodiment disclosed herein would become apparent from the following description when taken with the accompanying drawings, illustrating the invention. It will be understood, however, that the drawings are for purposes of illustration and are not to be construed as defining the scope or limits of this invention. Reference being had for latter purpose to the claims appended hereto.

DETAILED DESCRIPTION

Figure 1:
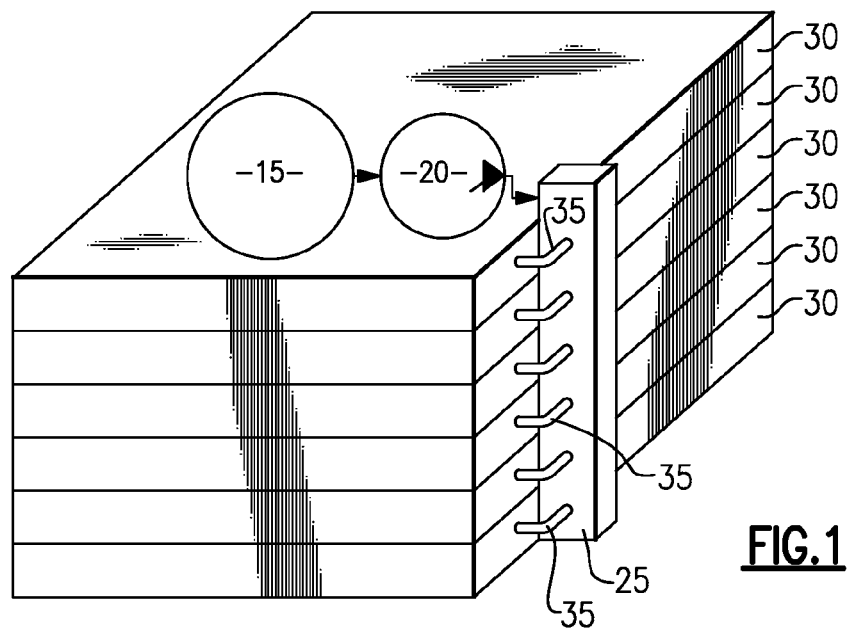
FIG. 1 is a perspective, partially symbolic, view of a fuel cell stack of the disclosure.

Referring to FIG. 1, a non-limiting embodiment of a simplified fuel cell stack 10 is shown. The fuel cell stack comprises a supply of cooling fluid 15, such as water or an appropriate gas, a pressurizing device 20, such as a pump, a manifold 25, a plurality of cells 30 and a plurality of conduits 35, each connecting to a cooling path opening 40 (see also FIG. 2) in each cell 30. Such a fuel cell stack 10 could be used with a phosphoric acid electrolyte (not shown) utilizing hydrogen and air as reactants though other electrolytes and fuel components are contemplated. Each cell may have a cooling path (not shown) through which the cooling fluid passes to cool that cell.

Cooling fluid 15 is pressurized by the pump 20 at about fifty psi, directed into the manifold 25, and distributed therethrough to each cell 30 via conduits 35 and the cooling path opening 40. There is nearly equal flow of cooling fluid within each cell 30 because each cell must reject the same amount of heat.

Figure 2:
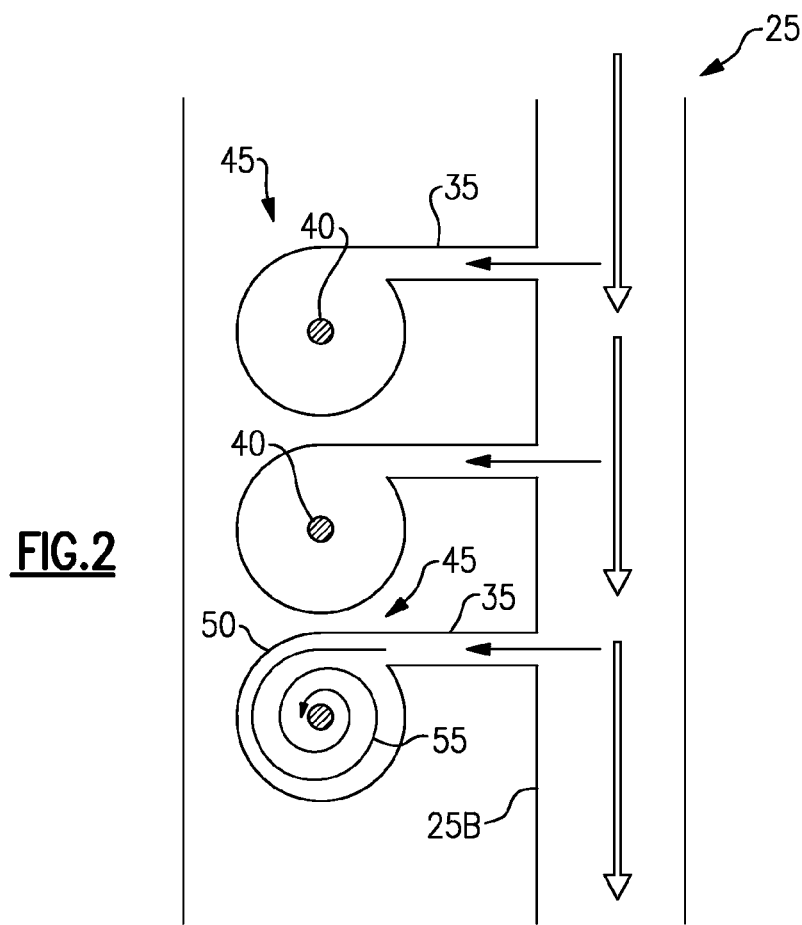
FIG. 2 is a perspective view of a plurality of swirl chambers and a manifold used in the fuel cell stack of FIG. 1.

Referring now to FIG. 2, a swirl chamber 45 is disposed between each conduit 35 extending from the manifold 25 and each cooling path opening 40. As the cooling fluid exits the conduit 35, a rounded portion 50 of swirl chamber 45 directs the cooling fluid to form a vortex having adjacent bands 55 of cooling fluid, the bands having decreasing radii as they move towards the cooling path opening 40. The vortex lowers the pressure of the cooling fluid 15 due to viscous reaction of the adjacent bands 55 of cooling fluid within the vortex. If the cooling fluid is a gas, the temperature of the cooling fluid drops as the gas expands in the chamber. As the cooling fluid 15 approaches the cooling path opening 40, it is at the appropriate pressure to cool each cell as may be required.

Though the manifold 25 is shown in FIG. 1 exteriorly to the cells 30, the manifold and the conduits 35 may also pass through and become an integral part of the cells as well. The manifold may simply be drilled through the aligned cells 30 and the conduits 35 and the swirl chambers 45 shown schematically here may be machined into or molded into the cells to minimize required parts of the system.

By utilizing swirl chambers in conjunction with the manifold 25, the extended tubing (not shown) and splitters (not shown) of the prior art are eliminated as are small openings (not shown) required for pressure drop that may clog or become obstructed thereby endangering operation of the fuel cell stack 10.

What is claimed is:

1. A cooling system for a fuel cell comprising:
   a manifold for delivering cooling fluid under pressure to said fuel cell stack, and
   a chamber communicating said cooling fluid from said manifold to said fuel cell stack for lowering the pressure of said cooling fluid entering said fuel cell stack, wherein said cooling fluid enters said fuel cell stack, where said cooling fluid enters said fuel cell stack at the lowered pressure,
   wherein said chamber comprises a swirl chamber in which a vortex is formed to lower said pressure of said cooling fluid.

2. The cooling system of claim 1 wherein said chamber is disposed in said manifold.

3. The cooling system of claim 1 wherein said chamber is disposed in said fuel cell stack.

4. The cooling system of claim 1 wherein said manifold is located upstream of said fuel cell stack.

5. The cooling system of claim 1 wherein said chamber is upstream of said fuel cell stack.

6. The cooling system of claim 1 wherein said chamber is configured to deliver cooling fluid to said fuel cell stack at the lowered pressure.

7. A cooling system for a fuel cell stack, said system comprising:
   a cell having a cooling fluid path opening therein,
   a manifold for delivering cooling fluid under pressure, and
   a chamber communicating said cooling fluid from said manifold to said cell for lowering the pressure of said cooling fluid before entering said cell, said chamber in direct fluid communication with said cell,
   wherein said chamber comprises a swirl chamber in which a vortex is formed to lower said pressure of said cooling fluid.

8. The cooling system of claim 7 wherein said chamber lowers a temperature of said coolant.

9. The cooling system of claim 7 wherein said chamber is disposed within said manifold.

10. The cooling system of claim 7 wherein said chamber is disposed within said cell.

11. The cooling system of claim 7 wherein said manifold is located upstream of said fuel cell stack.

12. The cooling system of claim 7 wherein said chamber is upstream of said fuel cell stack.

13. The cooling system of claim 7 wherein said chamber is configured to deliver cooling fluid to said cell at the lowered pressure.

14. The cooling system of claim 7 wherein said cooling fluid enters said fuel cells tack at the lowered pressured.

15. A method of lowering pressure of a cooling fluid entering a fuel cell stack comprising;
    communicating said cooling fluid from a manifold holding said cooling fluid,
    creating a vortex within said cooling fluid to lower said pressure of said cooling fluid, and
    communicating said cooling fluid to said fuel cell stack at the lowered pressure.

16. The method of claim 15 wherein said method includes the step of lowering a temperature of said coolant in said vortex.

17. The method of claim 15 wherein the step of communicating said cooling fluid from the manifold holding said cooling fluid includes communicating said cooling fluid from said manifold holding said cooling fluid to said vortex.

18. The method of claim 15 wherein said vortex is located within a chamber.

* * * * *

UNITED STATES PATENT AND TRADEMARK OFFICE
CERTIFICATE OF CORRECTION

PATENT NO. : 8,669,016 B2
APPLICATION NO. : 12/572504
DATED : March 11, 2014
INVENTOR(S) : Richard N. Fargo It is certified that error appears in the above-identified patent and that said Letters Patent is hereby corrected as shown below:

IN THE CLAIMS:

Claim 1, column 3, line 15: insert --stack-- after "cell"

Claim 8, column 4, line 9: delete "coolant" and replace with --cooling fluid--

Claim 16, column 4, line 33: delete "coolant" and replace with --cooling fluid--

Signed and Sealed this
Twentieth Day of May, 2014

Michelle K. Lee
*Deputy Director of the United States Patent and Trademark Office*